United States Patent
Wilson et al.

(10) Patent No.: US 6,289,252 B1
(45) Date of Patent: Sep. 11, 2001

(54) DISTRIBUTED BATCH PROCESSING SYSTEM AND METHODS

(75) Inventors: Grant Wilson; David L. Deitz; William G. Irwin; Godfrey R. Sherriff, all of Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 09/143,720

(22) Filed: Aug. 31, 1998

(51) Int. Cl.$^7$ .................................................. G05B 19/18
(52) U.S. Cl. ................................. 700/7; 700/18; 700/50; 700/100; 700/99; 709/100; 709/109
(58) Field of Search ................................ 700/7–10, 18–20, 700/99, 100, 108, 109, 110, 111, 112, 113, 114, 115, 116, 117, 50, 121; 709/100, 101, 102, 103, 104

(56) References Cited

U.S. PATENT DOCUMENTS

| | | | |
|---|---|---|---|
| 4,972,365 | * 11/1990 | Dodds et al. | 700/25 |
| 5,105,362 | * 4/1992 | Kotani | 700/121 |
| 5,241,465 | * 8/1993 | Oba et al. | 700/100 |
| 5,450,346 | * 9/1995 | Krummen et al. | 400/99 |
| 5,654,903 | * 8/1997 | Reitman et al. | 700/117 |
| 5,856,823 | * 1/1999 | Jones et al. | 700/100 |
| 5,997,169 | * 12/1999 | Watanabe et al. | 700/115 |
| 6,064,982 | * 5/1999 | Puri | 700/95 |

FOREIGN PATENT DOCUMENTS

| | | | |
|---|---|---|---|
| 0 825 506 A2 | 2/1998 | (EP) | G05B/19/418 |
| 2341240A | * 8/2000 | (GB) | |
| 200148702 | * 5/2000 | (JP) | |

OTHER PUBLICATIONS

Author Unknown; "NT–Based Recipe Provides Graphical Editor and Simplified Integration"; Control Magazine; Sep. 1997; pp. 146–147.

(List continued on next page.)

Primary Examiner—William Grant
Assistant Examiner—Ramesh Patel
(74) Attorney, Agent, or Firm—Chrisman, Bynum & Johnson, P.C.

(57) ABSTRACT

Methods and apparatus for batch process control in which a Phase Logic Module operable in accordance with the state machine model of the batch server program is embedded within a programmable controller. More specifically, a phase executed by the batch server program in a data processing device is operable in accordance with a pre-defined state machine model (typically compliant with the ISA S88.01 standard). A Phase Logic Module (PLM) is implemented within a programmable controller in accordance with the same state machine model so as to mirror the state machine operation of the batch server process within the programmable controller. The PLM is pre-implemented and standardized. Specific state logic for performing desired control in accordance with the desired batch processing is defined by a control engineer using well known languages and tools and integrated with the standard PLM state machine. These methods and structure obviate the need for the control engineer to implement customized state processing logic and the associated need to test such complex state processing logic. The PLM in the programmable controller and the phase within the batch server program communicate using a high level communication protocol to exchange state processing information. Another aspect of the invention provides for implementing a PLM in a data processing device to perform soft phase processing (a phase unrelated to process I/O equipment and rather typically related to operator interaction).

16 Claims, 8 Drawing Sheets

OTHER PUBLICATIONS

Farris, David; "SP88 Reduces Batch Variation"; Online Posting; Control Magazine; Aug. 1997; <http://www.controlmagazine.com/0897/c0740897.html>.

Piper, Peggy; "Distributed Control Systems Spread Out"; Online Posting; Control Magazine; Jun. 1997; <http://www.controlmagazine.com/0697/c0370697.html>.

Johnson, Dick; "Distributed control: A view of What's New"; Online Posting; Control Engineering Online; Sep. 1996; <http://www.manufacturing.net/magazine/ce/archives/1996/09/issues/na/09a700.htm>.

* cited by examiner-

DISTRIBUTED BATCH PROCESSING SYSTEM AND METHODS

BACKGROUND OF THE INVENTION

1. Field of the Invention

The present invention relates to automated process control and in particular to improved methods and systems for batch process control wherein a phase logic module operable in accordance with a state machine model is integrated within a programmable controller or within a data processing element.

2. Discussion of Related Art

Batch Processing

There are many types of industrial processes. Some run continuously until stopped, typically producing very large quantities of product between start-up and shutdown. Other industrial processes operate on groups of parts, with the group moving as a unit between workstations but with each part maintaining its own unique identity.

A third type of industrial process is the batch process, which involves subjecting raw materials to processing steps using one or more pieces of equipment to produce a "batch" of product. Cooking is an example of a batch process practiced in the home. Raw food is prepared, is placed in a pan, is cooked for a time specified by a recipe, and ends up as a dish or "batch" ready for eating.

Preparation of polyvinyl chloride is an example practiced on an industrial scale. Polyvinyl chloride is made by polymerizing or "joining together" much smaller molecules of vinyl chloride. This is accomplished by filling a batch reactor to the appropriate level with a mixture of vinyl chloride, solvent and polymerization inducer, heating the mixture in the reactor, cooling the resulting batch, and purifying the batch by removing leftover starting materials.

These are but a few examples of batch processes. In general, there are many different kinds of batch processes. They may include, for example, product manufacturing, distribution, and testing as well as several other product and non-product oriented processes.

Batch Process Control

Generally speaking, it is important to control a batch process. For one example, if a dish is left on the stove for too long during cooking, it will burn and the resultant batch of food will be ruined. For another example, if a reaction mixture of vinyl chloride is not reacted long enough, the yield of polyvinyl chloride from the process will be inadequate and money will be lost. Control of a batch process can become critical where production of dangerous chemicals or comparable entities is involved.

One way to control a batch process is manually. That is, one or more workers are assigned the job of watching all aspects of batch process to be sure that everything is proceeding according to plan. However, this is tedious work, and errors can creep in unnoticed.

For these and other reasons, workers in the field of batch control have been trying for some time now to automate the control of batch processes by using electronic devices. Computers, programmable controllers and comparable electronic devices have been used in conjunction with intelligent field devices (i.e., intelligent sensors and controllable valves) by a number of batch control system suppliers to automate the control of batch processes.

An intelligent sensor is typically placed on a piece of equipment and reports on equipment conditions to a central control room in the plant. A controllable valve typically controls the input to, or output from, a piece of equipment, and can be controlled from a central control room, often based on information received from an intelligent sensor.

Efforts to automate batch processing have led to the formation of standards committees by members of industries involved in batch processing and suppliers of batch processing equipment, among others. The general purpose of these standards committees has been to define uniform standards for automated batch processing.

One such standard has been promulgated by the International Society for Measurement and Control, an international organization concerned with issues of process control. This standard is entitled *Batch Control Part 1: Models and Terminology* and is often referred to as the ISA S88.01-1995 standard (or "S88" for purposes of this application).

The S88.01 standard defines models of equipment and procedures for use in automated batch processes, as well as terminology for use in referring to those models and their elements. The S88.01 standard defines a "batch process" as a process that leads to the production of finite quantities of material by subjecting quantities of input materials to an ordered set of processing activities over a finite period of time using one or more pieces of equipment. A "batch" is defined as the material that is being produced or has been produced by a single execution of a batch process.

Procedural Model

Batch-processing equipment (i.e., controllable elements such as valves, heaters, mixers, etc.) is operated according to procedures to make a batch. For purposes of this application, all such equipment is referred synonymously to as equipment, equipment modules, processing equipment, or physical element. The procedures to operate such physical elements are often referred to by the S88.01 standard as the "procedural model." According to the S88.01 standard, the procedural model is structured as a hierarchical ranking of procedures, with the highest level encompassing each of the lower levels, the next highest level encompassing each of the levels below it, and so on. The levels of the S88.01 procedural model of particular interest for purposes of this application are, in descending order:

the "procedure"
the "unit procedure"
the "operation"
the "phase"

The term "procedural element" is used in this application to refer to any embodiment or implementation of any of these levels of the S88.01 procedural model, not just to those of the "procedure" level or any other single level of the procedural model.

The highest-level procedural element of interest is referred to as a procedure, which is made up of one or more unit procedures. Each unit procedure is in turn made up of one or more operations, which are each in turn made up of one or more phases. The S88.01 procedural model does not preclude definition and use of other hierarchical levels, nor does it require that each level be present in particular applications. Rather, the standard is intended to provide a broad, standardized model for describing the procedures followed in automated batch-process control.

FIG. 8 graphically depicts the hierarchical relationship of procedural elements defined by the S88.01 standards. A procedure 800 is comprised of one or more unit procedures 802. Each unit procedure 802 is comprised of one or more operations 804. Each operation 804 is generally comprised of one or more phases 806. As noted above each phase is generally in communication with one or more units 820 (a collection of process equipment physical elements) collectively referred to as a process cell 825 to effectuate the desired control of a batch process. As also noted above, other higher level elements of the procedural model are generally abstractions of the lower level elements (i.e., operations are abstractions of one or more phases, etc.).

Linkage of Physical and Procedural Elements

In general, procedural elements are implemented as computer programs that are executed by and within data-processing devices, including personal computers, workstations, and programmable controllers. Execution of a typical procedural element results in an electrical or optical output from the data-processing device that can be used to control a physical element, typically by connecting an output of the data-processing device to the physical element directly, or indirectly over a local-area or wide-area network.

A procedural element performs its assigned task by invoking "basic control" with respect to at least one physical element. This type of control is dedicated to establishing and maintaining a specific desired state of the physical element. Basic control would, for example, start or maintain a flow of material in a storage bin element or heating of starting materials in a polyvinyl chloride reactor element.

In practice, the lower levels of the procedural model (namely phases) perform the actual communications with the actual physical elements thereby invoking or performing basic control. The higher levels of the procedural model are essentially abstractions to improve organization and structure of the procedural model, and the physical model as well.

Procedural Elements and the State Machine Model

A state machine model is a logical construct commonly used to describe the state of a process or activity. The model describes or defines a number of process states, together with actions that cause transitions between those states. A state machine model of a process is said to be in a particular state due to an earlier transition into that state. When a particular event occurs or a particular status is sensed, the state machine model makes a transition to another state corresponding to the particular event or sensed status.

A state machine model is a useful technique for defining and implementing the operation of a procedural element of a batch process. A procedural element defined and implemented as a state machine initiates an action, for example, when its associated state machine makes a transition from an old state to a new state.

The S88.01 standard permits definition and implementation of procedural elements in accordance with a standard state machine model. While the S88.01 standard does not mandate this approach, it has been broadly adopted in the process control industry to enable a higher degree of interoperability among the products of various vendors (as explained further below). One present commercial application of the S88.01 standard having procedural elements defined and implemented according to a state machine model is the OpenBatch™ product from PID, Inc. at 2429 West Desert Cove Avenue, Phoenix, Ariz. 85029.

In OpenBatch, a server program runs on the data processing device that executes procedural elements. The server program coordinates execution of procedural elements in accordance with one or more state machine models. Procedures, corresponding unit procedures, corresponding operations, and corresponding phases are sequenced through their respective steps by the server program.

When a phase is initiated by the server program, for example, the phase communicates the initiation request to the phase logic interface within a programmable controller. The programmable controller then executes the actual state logic for the phase and provides the required process control through communications to the process equipment.

FIG. 7 depicts a typical phase communicating with one or more typical physical elements as presently known in the art. Phase 704 is operable within a batch server program 702 on a data processing device 700. State machine model 706 is operable within phase 704 to control the operation of the phase in accordance with a standard state model. Phase 704 communicates with one or more programmable controllers 710 via communication path 750. Programmed instructions in the programmable controller 710 provide one or more phase logic interfaces 712, one for each phase which uses the programmable controller 710.

Each phase logic interface 712 provides a mapped register communication interface for exchange of information with a phase 704. The mapped register communication interface, discussed further below, includes a number of registers 718 and a map 720 of the allocation of the registers. The information exchanged through the mapped registers 718 is used by phase logic 714 to implement the desired control functions in association with the state machine 706 operating within the phase 704. In other words, phase logic 714 is designed and implemented by the control engineer to mirror the operation of the state machine in the data processing device. State logic sequences 716 integrated with phase logic 714 executes the actual control sequences required to control the batch process.

Problems in the Art

A problem arises when each manufacturer implements a different means and method for communicating the requisite information between the data processing device and the programmable controller. Because of this, communications between a phase in the data processing device and the phase logic interface in the programmable controller may be very different from the communications required for another brand of programmable controller, even though both programmable controllers perform essentially the same function.

The result is that a process control design engineer may need to design, implement, and maintain a large volume of custom software to permit a particular phase to communicate with, for example, an Allen-Bradley programmable controller, and simultaneously design, implement, and maintain an entirely separate volume of custom software to permit the phase to communicate with, for example, a Fisher-Rosemount systems, Inc. PROVOX programmable controller. This overlap of effort is inefficient and wasteful.

Further, a common communication interface known in the art for a number of equipment manufacturers is a register model. The phase logic interface presents itself to the procedural element as a large set of registers—readable and/or writable storage locations for exchanging information between the phase within the data processing device and the phase logic interface in the programmable controller. The registers are logically mapped by the control engineer into necessary aspects of control for a phase. Logic corresponding to functions defined by the control engineer for each register of a phase is implemented in the programmable controller phase logic interface by the control engineer. The map of registers as used by a particular phase is maintained by the control engineer. Though there exist tools to aid in documenting the mapping of registers for a phase, the task remains largely a manual task and the responsibility of the control engineer.

As a batch process changes and evolves, the documentation for the register mapping must be maintained and updated—another largely manual process for the control engineer. Further, where there are multiple phases in a batch process, each phase uses a number of such logically mapped registers to implement basic control for that phase. It is common for large, complex batch processes to define hundreds if not thousands of phases involved in the production of a batch. The task of generating and maintaining a usable map documenting each phase and the corresponding registers used in performing requisite controls is indeed a daunting one.

For example, it is typical for a phase in a programmable controller to utilize approximately 15 registers to implement required control sequences for a single phase. A typical batch process may include approximately 100 phases to perform the processing of a batch. The control engineer is therefore responsible for initially defining and maintaining a map describing approximately 1500 registers. Where more programmable controllers are used for a larger batch process and where more phases are required for more complex batch processes, the number of registers to be mapped may grow quite large.

Furthermore, aspects of the state machine model of a phase must be communicated between the data-processing device executing the phase and the programmable equipment controller of the corresponding equipment module. In essence, portions of the server program's state machine model need to be understood and stored within the programmable controller. This further complicates the programming and engineering tasks because these functions are often not well understood by process control engineers. In addition, the control languages implemented within most programmable controllers are generally not well suited for the implementation of state machine logic and are generally not transportable between programmable controllers developed by different manufacturers. Though some of the program instructions for tracking the state machine model could be copied for implementing the control logic for each phase, the replicated code sequences would still require testing. Each of the instructions sequences would require detailed testing to assure proper operation of the batch process in each state for each phase implemented in he programmable logic controller.

Still further problems arise in present techniques in that when a failure occurs in processing of a phase, there are no standard techniques for communicating appropriate failure processing information between the data processing device performing the phase and the programmable controller performing the requisite basic control. Rather, again, the control engineer has been responsible for designing and maintaining a unique failure processing method and associated program instructions and communication paths for exchanging control information regarding the failure.

Yet another problem arises in prior techniques where processing of a phase requires performing processing within a non-standard device. For example, a phase may require certain forms of user (operator) input to perform its phase processing. The requisite input may be obtained from a user input device such as a keyboard, display or barcode reader. Such devices do not generally utilize the register model communication standards commonly used in exchanging information between a phase in a data processing device and programmable controller phase logic interface. Current techniques therefore require yet another form of communication and processing with the phase to implement such phase processing.

It is apparent from the above discussion that a need exists for an improved method and structure for communicating phase control information and related state and failure information between procedural elements (i.e., phases) in the data processing device and the phase logic in the programmable controller.

SUMMARY OF THE INVENTION

The present invention solves the above and other problems, to thereby advance the state of the useful arts, by providing methods and structure for standardizing an interface between a procedural element (a phase) in the data processing device and the phase logic that is executed in the programmable controller. More specifically, the methods and structure of the present invention provide for the operation of physical elements in accordance with a state machine model which operates in parallel with, and is substantially identical to that of the phase operable in the data processing device.

The Phase Logic Module (PLM) implements the state machine model within a programmable controller. This PLM provides a consistent interface between the phase in the data processing device and the phase logic in the programmable controller. Further, the communication interface between the phase and the PLM utilizes an object oriented software design whereby the phase and the PLM are associated by name and/or ID. Attributes of the PLM object are used to communicate requisite control information between the phase and the PLM. Details of the communication protocol are provided herein below. This aspect of the present invention eliminates the need for a control engineer to initially define and maintain a register map describing a potentially large number of registers for each of a potentially large number of phases in a batch process.

The PLM within the programmable controller contains a state machine that mirrors the state machine model of the phase in the data processing device. The control engineer therefore does not need to repetitively implement programmed instructions in the programmable controller to track the present state machine information provided by the phase in the data processing device. Rather, these instructions are implemented once in advance of the control engineer's system design, in a standardized manner, and merely instantiated for each PLM corresponding to a phase.

More importantly, the control engineer does not need to design any logic specifically to mirror the state machine sequencing of the server program. Rather, the state machine aspect of the PLM is predetermined and fixed and need not be implemented nor even fully understood by the control engineer. Rather, the control engineer designs only the requisite control sequence required for controlling the batch process for each transition between states in the standard state machine model. Such control sequences are typically designed using sequential function charts (SFCs), ladder logic, structured text, or other tools and techniques well known to control engineers.

The standardized portion of the PLM which implements the state machine model is not replicated for each PLM. Rather, the single, standard state machine model is operable on a plurality of objects each of which represents the specific processing required for a particular state of a particular phase. The testing requirements for batch processes implemented in accordance with the present invention are therefore reduced due to the reduction of program instructions. The program instructions which implement the state machine are designed and implemented as a standard module which need not be verified for each instance of its operation.

The phase, operable in the data processing device by a server program, communicates with the PLM using a high level protocol describing the procedural element processing. State transitions and other parameters relating to the batch process, normally provided to the procedural element by the higher levels of the procedural model as implemented in the server program, are passed essentially in their entirety to the physical element.

Another aspect of the present invention allows for implementation of PLMs operable in accordance with a state machine for implementing phase processing in devices other than programmable controllers (i.e., user interaction phases as noted above). Such phases are referred to herein as "soft phases" and a PLM referred to as a "soft PLM" operate in a similar manner to that described above within the device. A soft PLM is operable in accordance with a state machine substantially identical to that of the server program procedural elements. As with hard PLMs (those operable in a programmable controller), soft PLMs exchange state transitions and other parameters with the server program.

More specifically, both hard and soft PLMs operate in accordance with a state machine substantially identical to that implemented in the server program's procedural elements. Further, the PLMs in accordance with the present invention communicate with procedural elements in the server in a simpler manner as compared to the register model of prior techniques. A batch control engineer designs custom modules which implement the desired basic control within the PLM for each of the standard operating states. The standard state machine itself and the engineer (user) supplied elements which effectuate the desired control tasks, in combination, comprise the PLM and are operable within a programmable controller or within the data processing device which implements the soft PLM. All necessary state and parameter information required to effectuate the desired processing is received in communications with the server program.

The above and other objects, aspects, features, and advantages of the present invention will become apparent from the following description and the attached drawing.

DETAILED DESCRIPTION OF THE PREFERRED EMBODIMENTS

Figure 1:
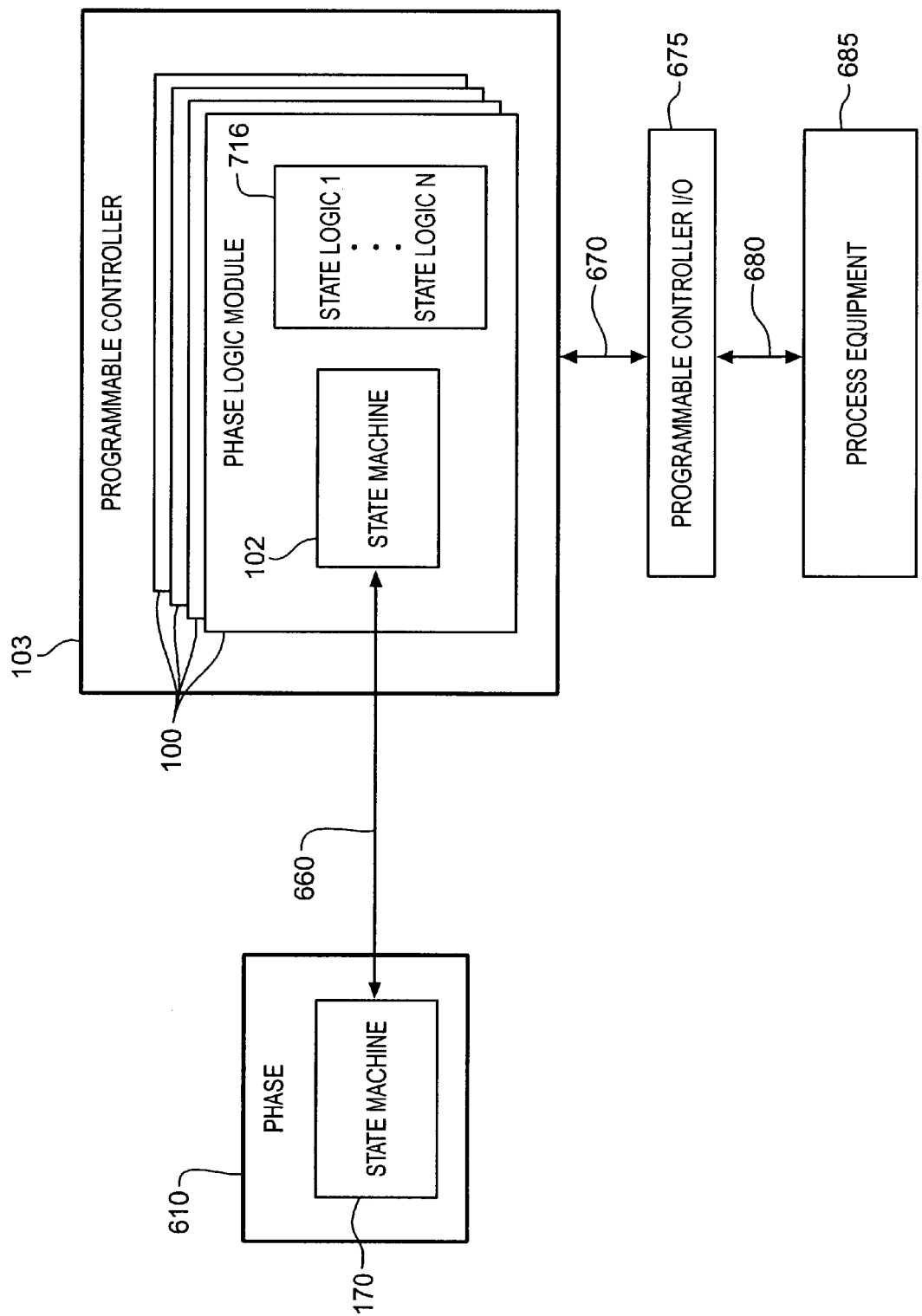
FIG. 1 is a block diagram showing the basic control relationship between a single phase and an equipment module in accordance with the present invention wherein an embedded PLM is operable in accordance with a state machine.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Distributed Batch Processing—Overview

Figure 6:
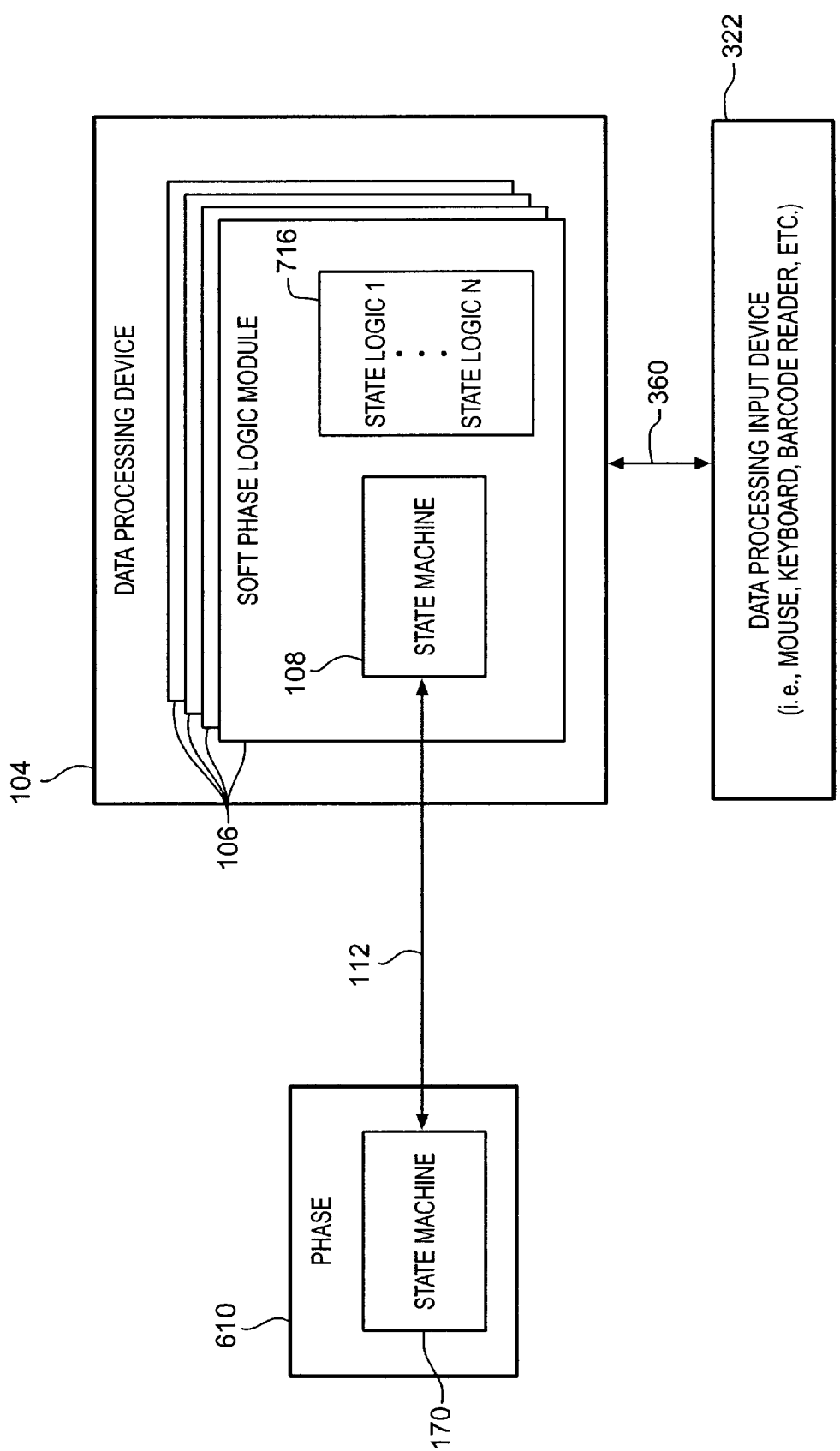
FIG. 6 is a block diagram showing the basic control relationship between a single phase and a soft phase in accordance with the present invention wherein an embedded PLM is operable in accordance with a state machine.
Figure 7:
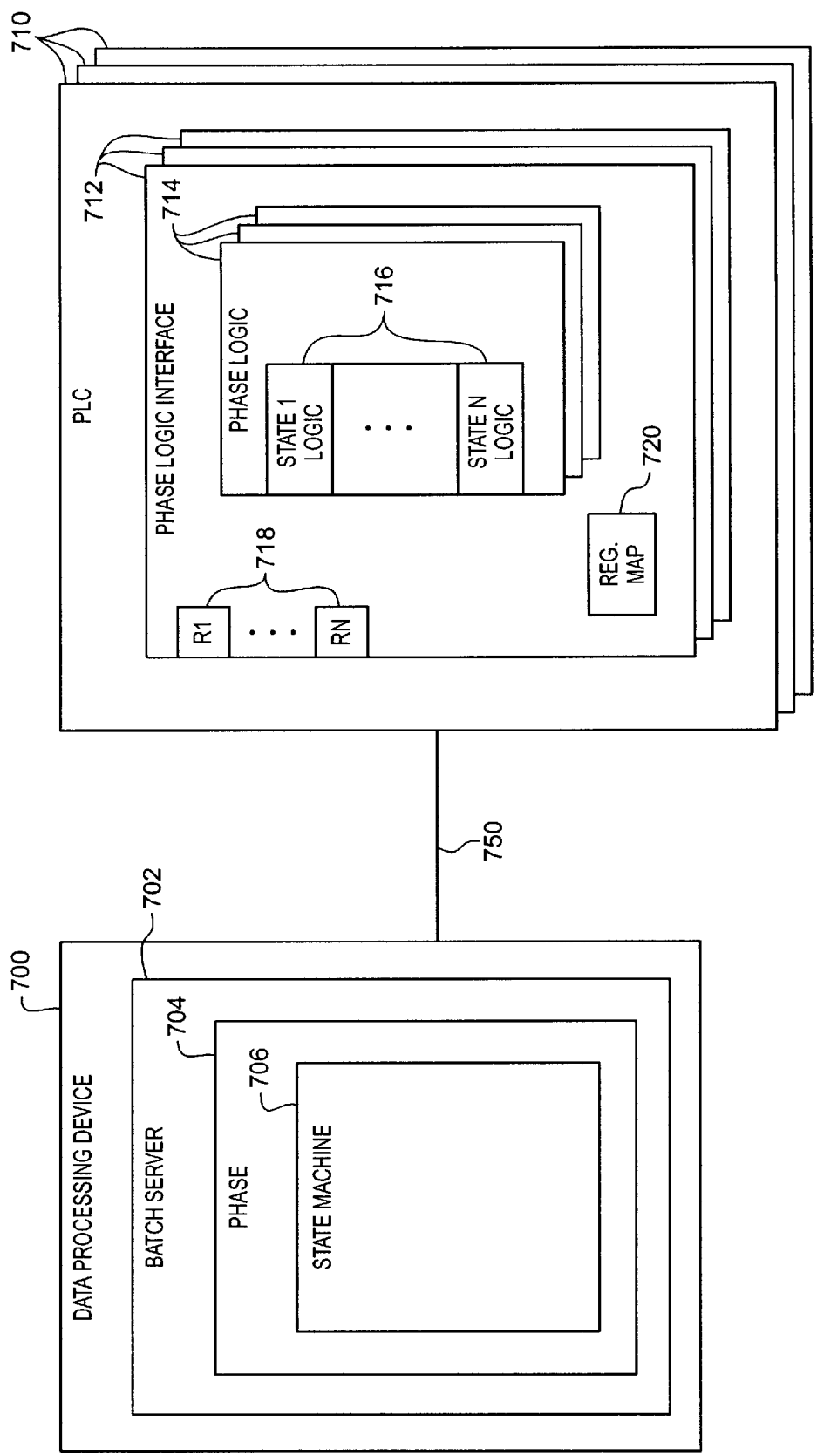
FIG. 7 is a block diagram showing the basic control relationship between a single phase and a corresponding equipment module as presently practiced in the art.
Figure 8:
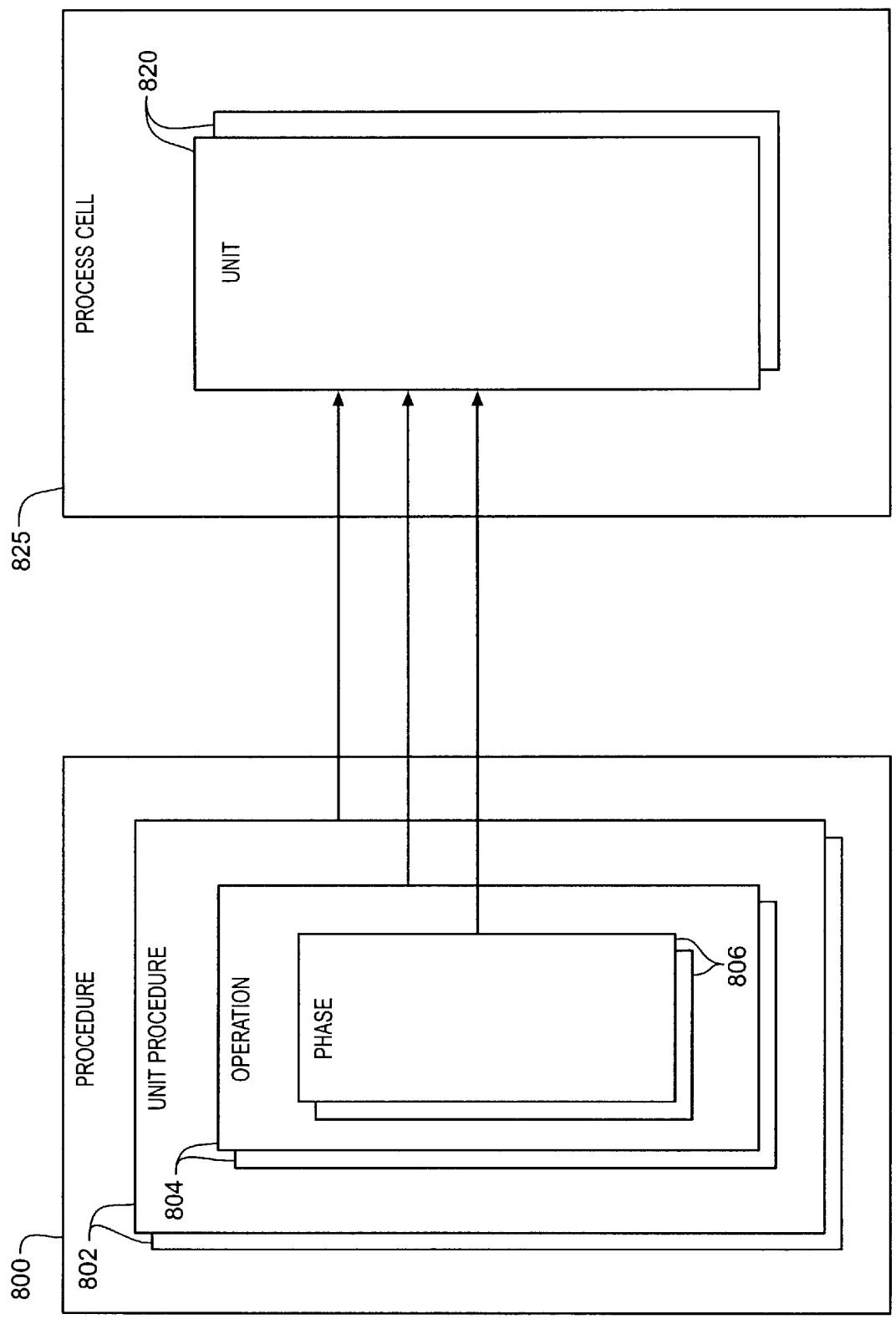
FIG. 8 is a block diagram showing the hierarchical levels of elements of the S88 procedural model and the hierarchical levels of elements of the S88 physical model.

An overview of the invention of this application is depicted in FIGS. 1 and 6. FIG. 1 is a block diagram depicting a phase 610 (a procedural element) which provides high level state information via path 660 to PLM 100 operable within programmable controller 103. More specifically, phase 610 is operable in accordance with state machine 170 while PLM 100 within programmable controller 103 is operable in accordance with state machine 102. As described above, state machine 102 is substantially identical to state machine 170. The two state machines communicate via path 660 through the exchange of high level state information as described further herein below.

As compared to prior techniques, PLM 100 of FIG. 1 obviates the need for voluminous documentation to map a large number of registers used for communication between prior equipment modules and corresponding phases. Rather, a standardized high level command structure is used and discussed in further detail herein below.

In addition, as compared to prior techniques, PLM 100 provides a standard, single implementation of state machine 102. The single implementation of state machine 102 is operable on one or more state logic sequences 716. In other words, each PLM 100 operates in accordance with a single state machine 102. Each phase logic module however includes a unique state logic sequence 716 defined by the control engineer to implement the required control for each standard state of a corresponding phase 610.

Operating under the direction of state machine 102 in PLM 100, programmable controller 103 communicates with programmable controller I/O 675 via path 670 which, in turn, communicates with process equipment 685 via path 680 to effectuate desired basic control.

As noted above, state logic sequences 716 are preferably implemented as sequential function charts (SFCs), structured text, ladder logic or other controller programming languages as are well known to those skilled in the art. The single, standard state machine 102 within PLM 100 operates on behalf of each of one or more state logic elements 716 to effectuate the processing for all phases implemented with the programmable controller 103. This obviates the need for testing a plurality of similar yet independent implementations of a state machine model as was previously known in the art.

FIG. 6 is a block diagram depicting a phase 610 (a procedural element) which provides high level state information via path 112 to soft PLM 106 operable within soft phase 104. More specifically, phase 610 is operable in accordance with state machine 170 while soft PLM 106 within data processing element 104 is operable in accordance with state machine 108. As described above, state machine 108 is substantially identical to state machine 170. The two state machines communicate via path 112 through the exchange of high level state information as described further herein below.

As above with respect to FIG. 1, soft PLM 106 of FIG. 6 provides a standard, single implementation of state machine 108. The single implementation of state machine 108 is operable on a state logic sequence 716 unique to each soft PLM 106. In the data processing device 104 of FIG. 6, state logic sequences 716 are preferably implemented as standard software elements as are well known to those skilled in the art. The single, standard state machine 108 within each soft PLM 106 operates in accordance with state logic elements 716 to effectuate the processing for all phases implemented with the data processing device 104. This obviates the need for testing a plurality of similar yet independent implementations of a state machine model as was previously known in the art. Data processing device 104 then communicates with data processing input/output devices 322 via path 360 to effectuate the processing required by the soft PLM 106.

Figure 3:
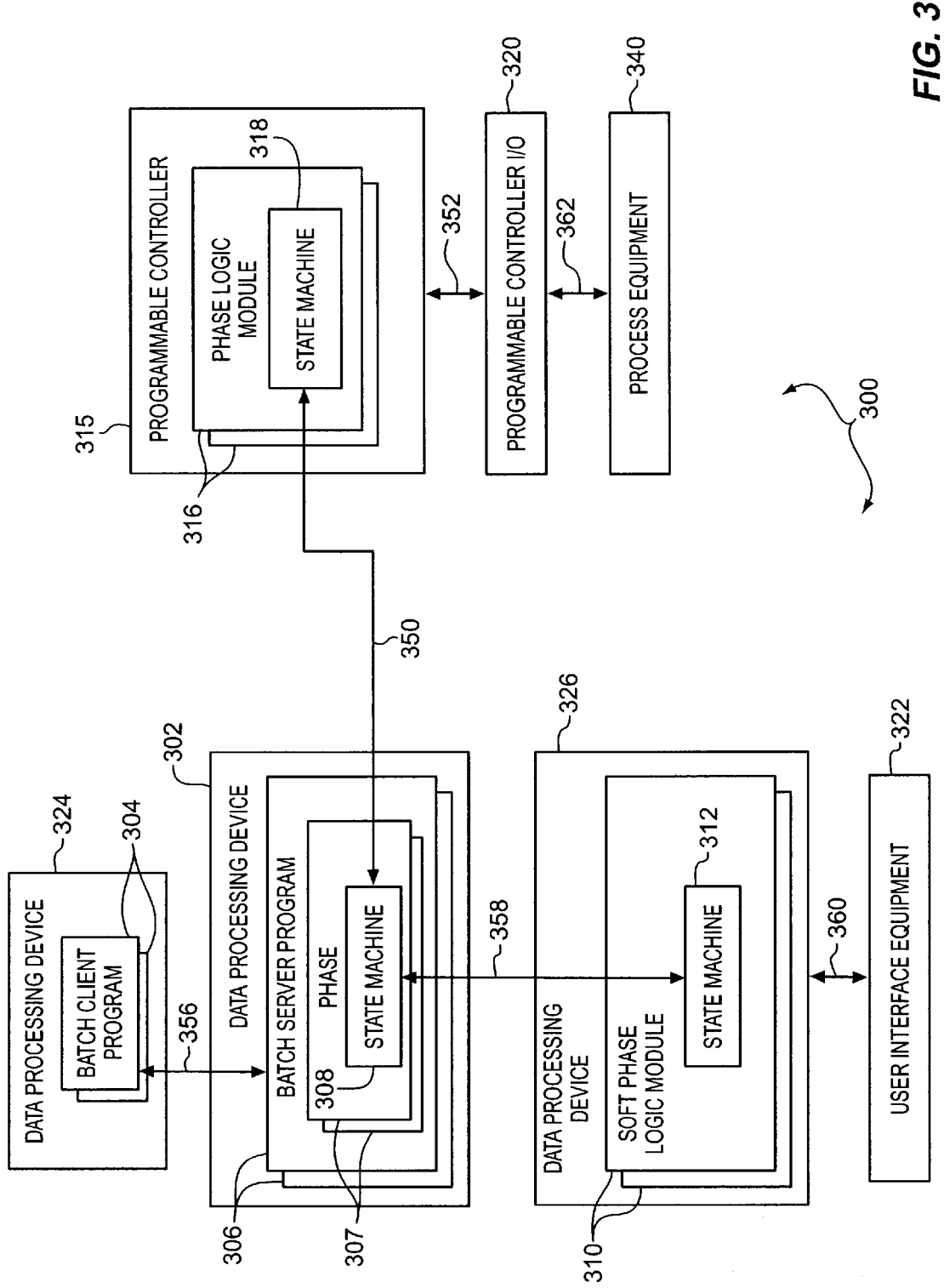
FIG. 3 is a block diagram depicting the batch server program state machine model in communication with a state machine model operable within a PLM within a programmable controller.

FIG. 3 depicts an exemplary system 300 operable in accordance with the teachings of the present invention to perform batch control. A process engineer or other user initiates processing of the batch from a data processing device 324 by interacting with a batch client program 304. Batch client program 304 provides an appropriate user interface of (i.e., a graphical user interface or GUI) which allows the user to initiate processing for a batch and to control the processing of the batch through to completion.

Batch client program 304 communicates with a batch server program 306 via inter-process communication path 356. Batch server program 306 is operable on data processing device 302 and is responsible for initiating and monitoring procedural elements responsible for producing the batch requested by a batch client program 304. As is known in the art, batch server program 306 includes elements which implement one or more phases 307 to perform the necessary processing steps for producing the requested batch. Each phase 307 is operable in accordance with a state machine 308. Further, a plurality of batch server programs 306 may be distributed within a manufacturing or other process control networked enterprise. Each batch server program 306 in such a distributed environment may be responsible for a particular subset of batch processes or batch manufacturing within the enterprise.

As shown in FIG. 3 a plurality of such batch client programs 304 may be operable on data processing device 324 (also commonly referred to as workstation or personal computer or simply computer). Furthermore, those skilled in the art will readily recognize that batch client programs 304 may also be operable on other remote workstations (not shown) communicating via well-known network and distributed computing techniques. Alternatively, batch client programs 304 may be co-resident on a single data processing device with batch server program 306. The specific distribution of such client and server programs in distributed client/server applications is largely irrelevant as is well known to those skilled in the art and many equivalent topologies of distributed programs and data processing devices may be used in conjunction with the present invention.

Those skilled in the art will further recognize many well-known inter-process communication techniques utilizing path 356 to permit client/server communications between batch client program 304 and batch server program 306. Such inter-process communications are operable regardless of the physical proximity of the client/server programs or network topology on which batch client programs 304 and batch server program 306 are distributed.

Distributed Batch Processing—Phase Logic Modules

Programmable controller 315 provides physical control over the batch manufacturing process in accordance with procedural directives received from batch server program 306 operable within user workstation 302. In accordance with the present invention, programmable controller 315 includes an embedded PLM 316. Also, in accordance with the present invention, PLM 316 is operable in accordance with a state machine 318. In particular, state machine 318 is substantially identical to state machine 308 operable within batch server program 306.

Further, in accordance with the present invention, state machine 308 within batch server program 306 exchanges with state machine 318, via path 350, high level state transition and other parameter information regarding processing of a batch.

PLM 316 within programmable controller 315 operates in accordance with state machine 318 so as to obviate the need for process engineers to generate voluminous custom programming solely for the purpose of monitoring and tracking state information in the performance of basic control sequences. Rather, in accordance with the present invention, and as discussed herein below, state logic modules are integrated with programmable controller 315 to perform desired basic control corresponding to the particular phase within the PLM 316. Lower-level, basic control commands are then sent the programmable controller process I/O 320 via path 352 and then to the process equipment 340 via path 362.

As shown in FIG. 3, a plurality of PLMs 316 may be embedded within a single programmable controller 315. Each of such a plurality of PLMs 316 operates in accordance with a state machine 318 which is substantially identical to state machine 308 within batch server program 306. Further, each of such a plurality of PLMs 316 includes user supplied state logic modules, as described herein below, to implement specific basic control sequences for their respective phases.

In the best presently known mode of practicing the invention, programmable controller 315 is programmed to perform basic control tasks. The basic control tasks performed by programmable controller 315 is in accordance with the user supplied state logic elements integrated with state machine 318 in PLM 316. The sequencing of such tasks is also in accordance with state machine 318 in PLM 316.

Soft PLMs 310 operable on data processing device 326 are similar in structure to PLMs 316 operable within programmable controller 315. They are similar in the sense that soft PLMs 310 are operable in accordance with state machine 312 which is, in turn, identical to the state machine 308 of the batch server program 306. Soft PLMs 310 differ from PLMs 316 in the type of functions and controls performed thereby. In particular, PLMs 316, as noted above, provided basic physical control relating to physical properties and attributes of the batch material and a process to manufacture same. By contrast, soft PLMs 310 implement phases generally indirectly related to the physical properties in attributes of the batch and the associated manufacturing process. One example of such a soft phase is a phase that obtains user input to determine particular attributes or properties not automatically attainable through the batch control process. More generally, soft phases are operable to verify or gather user supplied information relating to the batch and the process for manufacturing same. Soft PLMs 310 and the respective embedded state machines 312 therefore interact with user interface equipment 322 via path 360 in accordance with commands and parameters exchanged with batch server program 306 via path 358.

Those skilled in the art will recognize that soft PLMs 310 may be operable on distributed computing device remote from the batch server as shown in FIG. 3 or may be co-resident with the batch server program. Well known interprocess communication techniques enable such communication regardless of the physical proximity of the various processes and regardless of the topology of data processing devices over which the processes may be distributed.

Phase Logic Module State Machine

Figure 2:
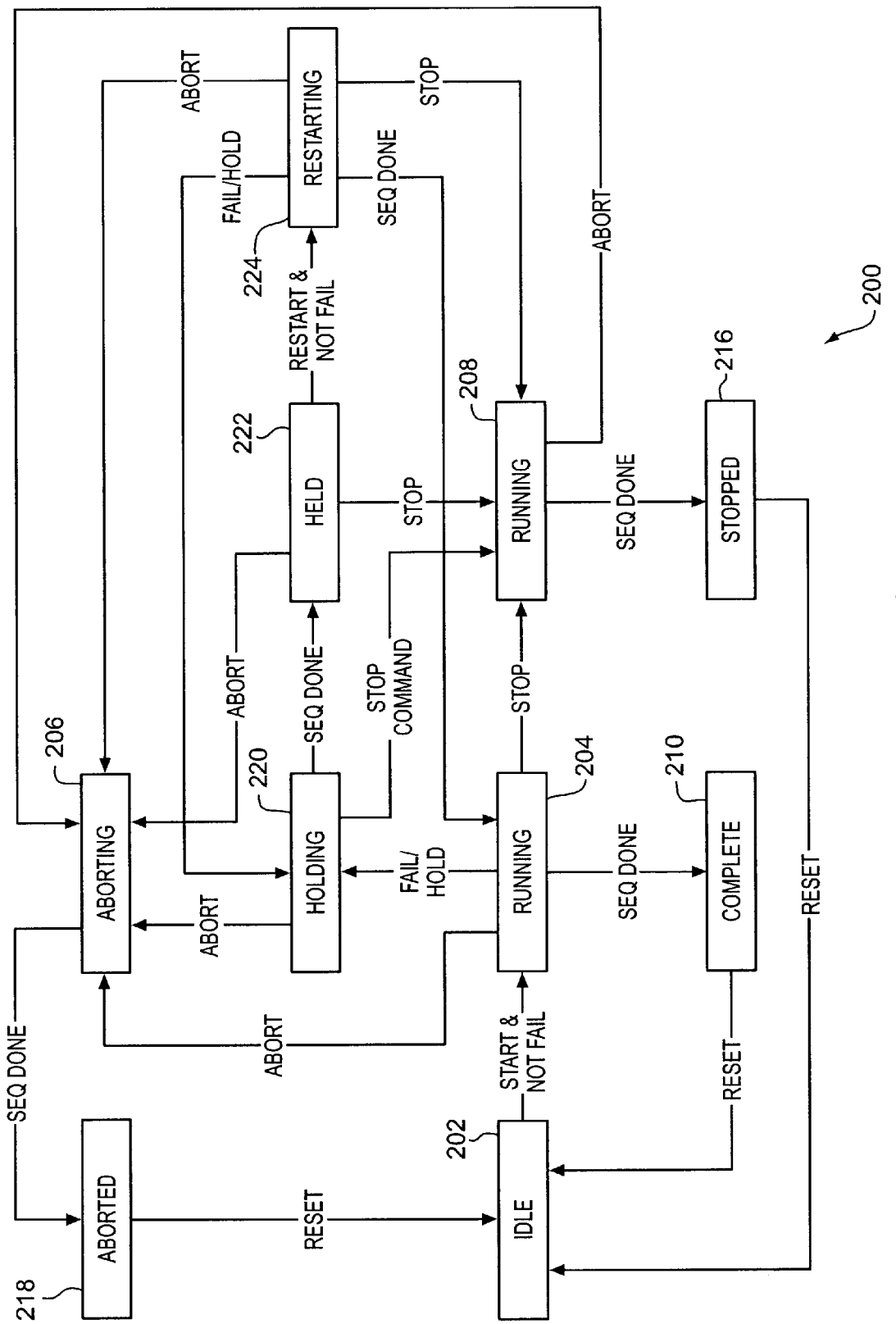
FIG. 2 is a state machine diagram describing the operation of a procedural control element in accordance with the S88.01 standards and in accordance with the best presently known mode of practicing the invention.

FIG. 2 is a state machine diagram describing a preferred state machine model in accordance with the present invention. The state machine depicted in FIG. 2 is in compliance with the exemplary state machine provided in the ISA S88.01 standards. As noted in the ISA S88.01 specifications, no particular state machine model is required by the standard. Rather, the state machine model described in the S88.01 standard is suggested as an adequate model for describing many useful batch processes. The standard permits addition or deletion of states in the model as well as transitions between the various states.

state 220 and eventually to the held state 222. Completing the desired processing of a batch in running state 204 causes a transition to the complete state 210.

The complete state 210, the aborted state 218, and the stopped state 216, are all terminal states such that the a reset command is required to make the transition back to the idle state 202 ready to initiate another batch process. The held state 222 is an interim state in that processing of the batch may continue by returning to the running state 204. Specifically, from held state 222, a restart command causes a transition to the re-starting state 224 and eventually to the running state 204.

TABLE 1

|            | (none)   | start   | stop     | fail/hold | restart    | abort    | reset |
|------------|----------|---------|----------|-----------|------------|----------|-------|
| idle       |          | running |          |           |            |          |       |
| running    | complete |         | stopping | holding   |            | aborting |       |
| complete   |          |         |          |           |            |          | idle  |
| holding    | held     |         | stopping |           |            | aborting |       |
| held       |          |         | stopping |           | restarting | aborting |       |
| restarting | running  |         | stopping | holding   |            | aborting |       |
| stopping   | stopped  |         |          |           |            |          |       |
| stopped    |          |         |          |           |            |          | idle  |
| aborting   | aborted  |         |          |           |            |          |       |
| aborted    |          |         |          |           |            |          | idle  |

As noted above, the state machine model of FIG. 2 is implemented and embedded both within the batch server program 306 of FIG. 3 and within PLMs 316 embedded within programmable controller 315 also shown in FIG. 3. Further, as above, soft PLMs 310 (or 102 of FIG. 6) are also operable in accordance with a substantially similar state machine 312 (or 108 of FIG. 6).

Details of the operation of the state machine shown in FIG. 2 are provided in the state transition table (Table 1) herein below. The state transition table lists each of the states in the state machine in rows of the table and commands that cause transitions in columns of the table. The intersection of each row with each column indicates which new state, if any, the state machine will be in after receipt of the corresponding command. Where no new state is so listed, the state machine does not make a transition to a new state.

In general, state machine model 200 is initialized in, and reset to, the idle state 202. Transitions are made to other states based upon, in general, commands indicative of an action to be taken. Such commands are received from various sources including, for example, batch client program 304 in the case of state machine 308 operable within batch server program 306. More particularly with respect to state machines 312 and 318 operable in accordance with the present invention within PLMs 310 and 316, commands and other parameters are received via path 350 from batch server program 306 within data processing device 302.

A start command causes a transition into the running state 204. In the running state 204, state logic supplied by the user performs appropriate lower-level control sequences (i.e., basic control) to cause the batch material to be produced in accordance with desired parameters. While in the running state 204, an abort command causes a transition to the aborting state 206 and eventually the aborted state 218. In like manner, a stop command causes a transition to the stopping state 208 and eventually to the stopped state 216. The hold command causes a transition to the holding the In the state machine table above, ISA S88.01 standards suggest the following semantic interpretation of the commands listed across the top of the table as columns of the table:

Start—Orders the procedural element to begin executing the normal running state logic.

Stop—Orders the procedural element to execute the stopping state logic.

Fail/Hold—Orders the procedural element to execute the holding state logic.

Restart—Orders the procedural element to execute the restarting state logic to safely return to the running state.

Abort—Orders the procedural element to execute the aborting state logic.

Reset—This command causes the transition from a terminal state to the idle state to permit the initiation of processing a new batch. No user supplied state logic is associated with this command or the associated state transitions.

In the above state machine of the preferred embodiment of the present invention, some states and transitions have been eliminated to simplify the state machine model while remaining within the spirit of the ISA S88.01 standards and suggestions. The semantic interpretation of the commands that remain is as described above with respect to table 1. The additional fail command is treated identically to a hold command as defined above. A fail command represents the sensing of a failure condition in the processing of the batch phase. A failure is therefore treated the same as a user request to hold processing so that no further processing occurs with respect to the procedural PLM implementing the state machine.

Each transition to a new state in the state machine implemented within each PLM may cause basis control tasks to be performed to continue or initiate processing of the batch. User supplied state logic elements associated with various of the above described states define the particular processing to be performed when a transition is made into the corresponding state.

Figure 4:
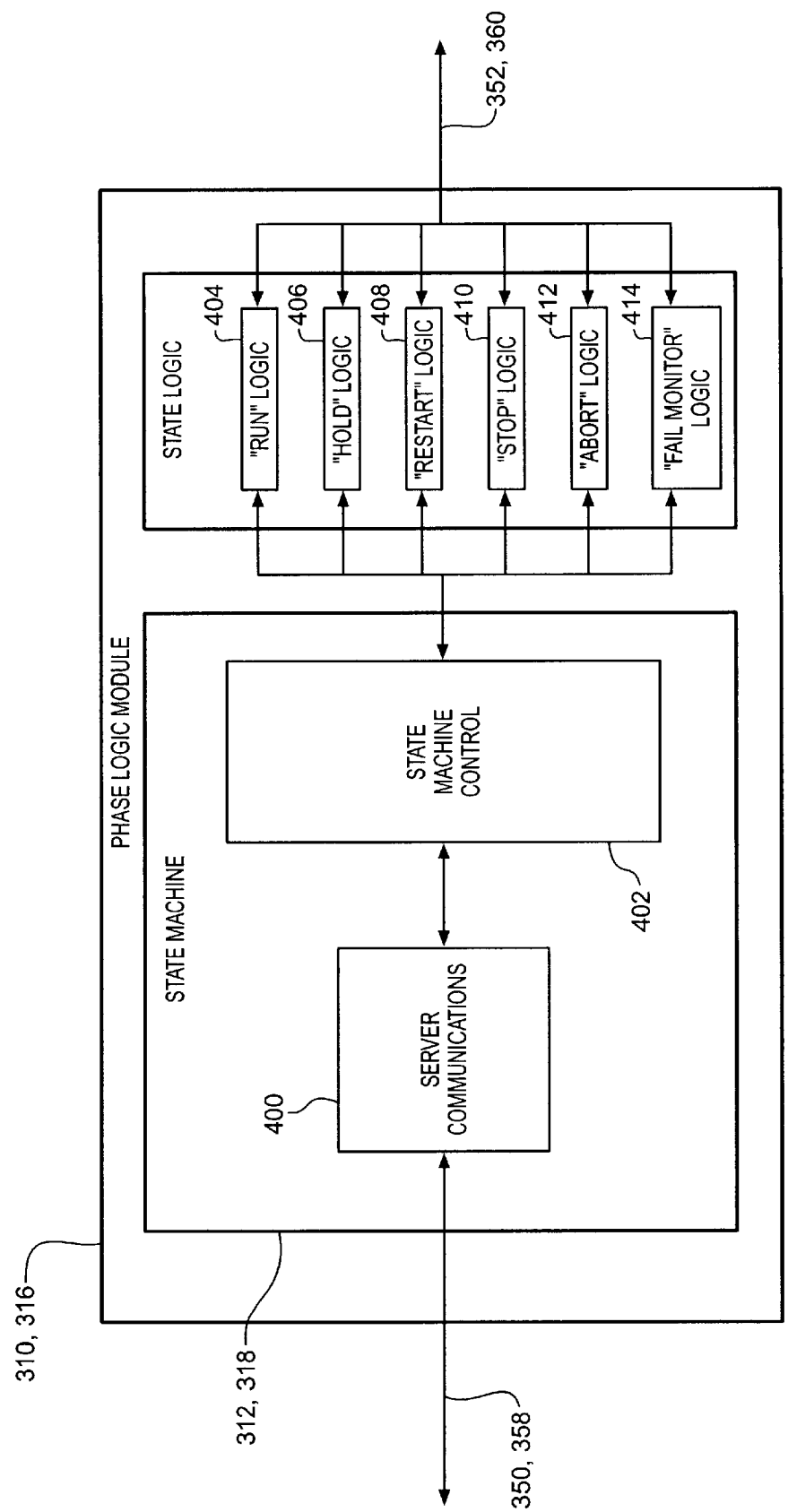
FIG. 4 is a block diagram showing the structure of a PLM as in FIG. 3 wherein user supplied elements are provided to implement the logic within each of the standard states of the state machine model.

FIG. 4 is a block diagram providing additional details of the structure of PLMs 310 and 316 and state machines 312 and 318 embedded therein, respectively. As noted above, soft PLMs 310 and PLMs 316 are similar in structure as are their respective state machines 312 and 318. Further, as noted above, state machines 312 and 318 implement a state machine model substantially identical to state machine 308 within batch server program 306. Soft PLMs 310 exchange information with batch server program 306 via path 358 and server communication element 400. In like manner, PLM 316 communicates with batch server program 306 via path 350 and its respective server communication element 400.

Server communication element 400 provides all necessary communication protocols and information required for inter-process communication between PLM state machines 312 and 318 and state machine 308 within batch server program 306. Further details of the specific protocol in communication related information are provided herein below.

Information received from the batch server program 306 via server communications element 400 are transferred to state machine control element 402. State machine control element 402 provides the fundamental state machine control and processing to implement the preferred state machine model described above with respect to table 1. User supplied state logic modules 404 through 414 provide the specific phase/state processing to be performed in each of various particular states of the state machine model of table 1.

In the preferred embodiment, a user/engineer provides a programmed module which performs the low level processing required when a transition is made to a corresponding state. In particular, a user supplied run state logic module 404 is performed by state machine control 402 while the state machine is operating in running state 204 of FIG. 2. A user supplied hold state logic module 406 is performed by state machine control 402 while the state machine is operating in holding state 220. A user supplied restart logic module 408 is performed by state machine control 402 while the state machine is operating in re-starting state 224. A user supplied stop logic module 410 is performed by state machine control 402 while the state machine is operating in stopping state 208. A user supplied abort logic module 412 is performed by state control 402 while the state machine is in aborting state 206. Lastly, a user supplied failure monitoring logic module 414 is performed by state machine control 402 while the state machine is operating in any state. In other words, failure monitoring logic module 414 is continuously operable regardless of the present state of state machine 312 or 319. The failure monitoring logic module 414 is operable to determine when a failure condition arises during operation of the respective PLM 310 or 316.

State logic modules 404 through 414 are supplied by a process design engineer in the form of software or other programmable modules. These are typically designed using sequential function charts, ladder logic, structured text or other tools and techniques well known to control engineers. In addition, any of several well-known programming languages including C, C++, Visual C++, Visual Basic, Pascal, Ada, etc. may be used to construct the user-defined state logic for soft PLMs.

Figure 5:
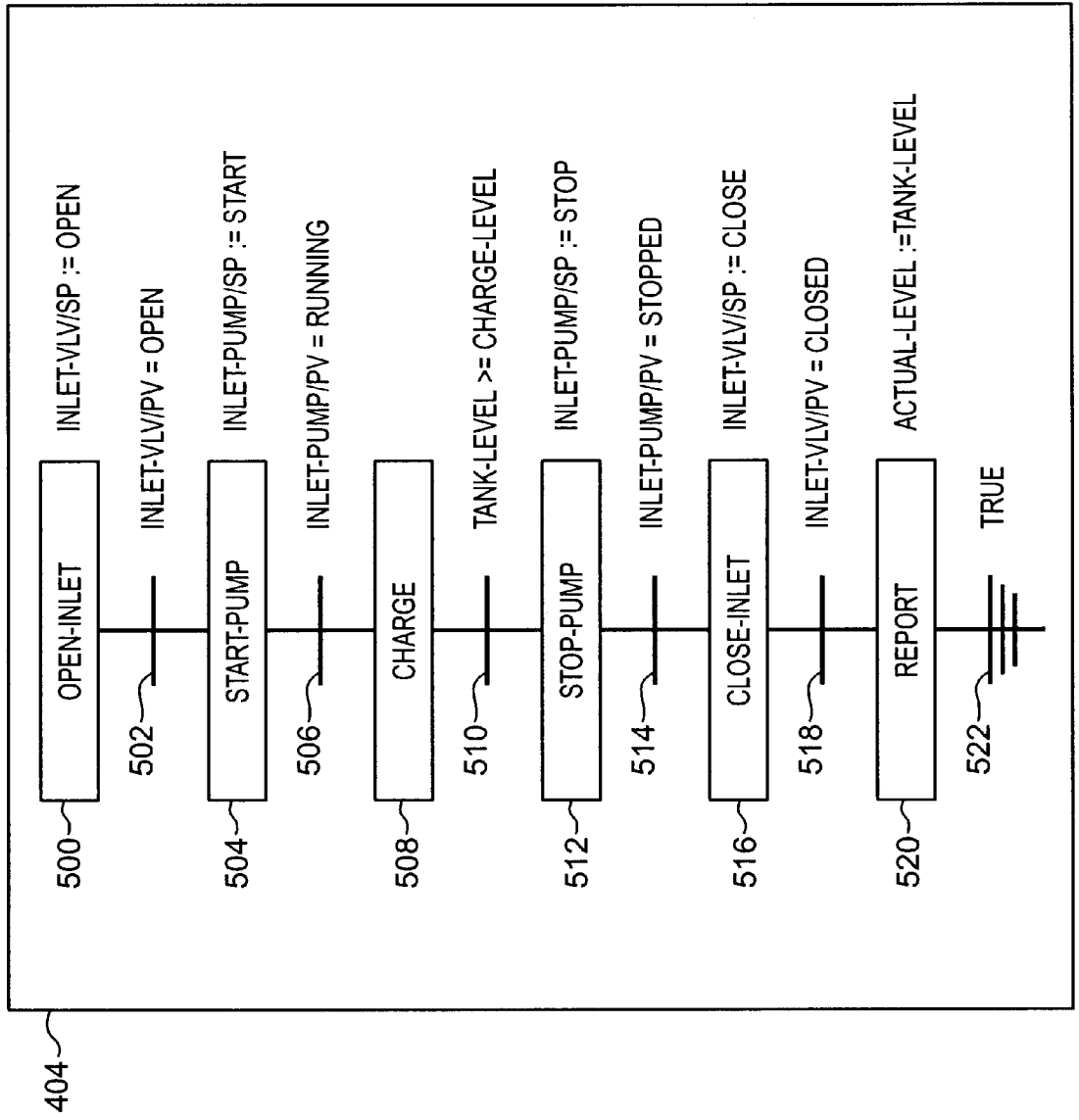
FIG. 5 is a depiction of a typical sequential function chart as may be used to describe the user supplied state logic in the PLM as shown in FIG. 4.

FIG. 5 depicts an example of a user supplied "Run" state logic module 404. FIG. 5 shows run state logic module 404 described in terms of a sequential function chart. In particular, element 500 represents processing to open an inlet valve while element 502 represents processing to await the status indicator representing an open state for the inlet valve. Next, elements 504 and 506 represent processing to start an inlet pump and await a status indicating that the inlet pump is running. Elements 508 and 510 represent processing to await completion of charging of a tank associated with the inlet pump to a predetermined charge level. Elements 512 and 514 then represent processing to stop the inlet pump and await a status indicative of the stopped state of the inlet pump. Elements 516 and 518 then represent processing to close the inlet valve and to await a status indicative of successful closure. Lastly, elements 520 and 522 represent processing to complete the sequential function chart by reporting the actual level of charge achieved in the tank associated with the inlet pump. Such sequential function charts are well-known to those skilled in the art of batch or process control. Such visual representations of sequence of control elements are translated by commercially available computing and software tools into instructions operable within the PLM 310 or 316 by execution of the state machine therein 312 or 318, respectively.

Those skilled in the art will recognize that the sequential function chart depicted in FIG. 5 is intended merely as exemplary of any programming language or other tool useful for defining the user supplied state logic modules 404 through 414 of FIG. 4. Any sequence of control operations may be supplied by the engineer in the state logic modules 404 through 414. Further, any of several well-known programming techniques may be used by the design engineer to program the sequence of sequential functions or a particular state logic module.

Server/Phase Logic Module Protocol

A communication protocol aspect of the present invention provides for the exchange of information between the substantially identical state machines operating within the batch server program and within PLMs. Essentially, the protocol provides for a high-level communication between the state machines of the batch server program and the PLMs. The batch server program communicates required state transitions via commands and status sent to the state machine resident within the PLMs. Status and other information are returned from the PLM to the batch server program. The commands are generally indicative of state changes performed by the batch server program state machine in accordance with operator input and other control input and parameters.

Information to be exchanged between the batch server program and the PLM are communicated by reading and writing values in attributes. Attributes are merely locations that may be read or written by the server program or the PLM as required to effectuate the required communication. This preferred embodiment closely mimics the register model structure well known to control engineers. This structure is therefore easily learned and understood by control engineers familiar with present techniques. However, as noted above, the methods and structures of the present invention do not require the mapping of hundreds or thousands of register for communication between the server program and the programmable controller. Rather a single set of pre-determined attributes serve this purpose in conjunction with the single standard state machine implemented and operable within the PLM of the programmable controller.

All communication between the server program and the PLM is preferably controlled by the server program. Information is transmitted from the server program to the PLM as required by writing attribute values for use by the PLM. Status and other information returned from the PLM is written by the PLM into appropriate attributes and read by the server program. The server program (via communication layers of software) is notified when the attribute values of interest within the PLM are modified.

In the preferred best presently known mode practicing invention, the following attributes are exchanged between state machines of the batch server program and PLM:

BCOMMAND

The BCOMMAND attribute is written by the batch server program (SERVER) to send a command to the PLM. A portion of the attribute (i.e., low order byte) provides the command code while another portion (i.e., high byte) provides a sequence number used to assure reliable communication between the SERVER and PLM.

More specifically, SERVER sends a command to PLM with an actual command value/identifier in the lower byte and an ID value in the upper byte. The command and ID are "sent" by storing the value in the BCOMMAND attribute. PLM receives the command and clears the lower byte to zero as a flag to SERVER that the command has been received. SERVER eventually detects that the lower byte of BCOMMAND has been so cleared and thereby understands that PLM has received and processed the command.

Exemplary commands include: abort, hold, stop, reset, restart, and start. Other commands may be useful in test and debug of PLMs. For example, a single_step command may be useful to debug a PLM user supplied state logic module with one low level basic control performed at a time (or other low level stepping). Or, for example, a download command may be useful to quickly download a new PLM from a development workstation through the SERVER to the PLM state machine. When a PLM detects a failure and sets a fail_index status attribute (as defined below), the SERVER may send a clrfail command to clear the "latched" failure status. Still other commands such as ackreq and clrreq may be used between the SERVER and PLM to provide protocol handshake pacing and reliability.

BSTATUS

The BSTATUS attribute is written by the PLM to reflect the current state of the PLM state machine. The SERVER reads this attribute to determine the present state of a particular PLM. The state encoded in the attribute is as described above with respect to table 1.

REQUEST/REQDATA1–5

The REQUEST and REQDATA1–5 attributes are written by the PLM to request information or services from the SERVER. When the SERVER has responded to the request, it clears the REQUEST attribute to so indicate completion of the request.

In the preferred embodiment, requests for services by PLM from SERVER fall into the following general categories:

| REQUEST Value | Function |
| --- | --- |
| 1000–1999 | Download some or all phase parameters |
| 2000–2999 | Upload some or all report parameter values |
| 3000–3999 | Send message to an operator |

-continued

| REQUEST Value | Function |
| --- | --- |
| 4000–4999 | Acquire or release resources |
| 5000–5999 | Phase to phase communication (for synchronization) |
| 6000 | Clear all outstanding requests |

Those skilled in the art will recognize myriad other requests which may be added to the above table as well as modifications to the above.

FAIL_INDEX

This attribute is written by the PLM (i.e., the user supplied failure monitoring state logic module) to indicate to the SERVER the occurrence of a failure in the processing of the PLM. The SERVER sends a clrfail command as above to clear the condition in the PLM (and eventually a reset or other command to reinitialize the PLM state machine). The particular types of failure and codes representing same are a matter of design choice for the PLM engineer.

UNIT

The UNIT attribute is written by the SERVER when it "connects" with the PLM. Since multiple servers may use a particular PLM (i.e., to operate the physical model equipment to produce different batches), this attribute represents an ID of the SERVER which is presently connected to the PLM.

OWNER

This attribute is written by the PLM to inform the SERVER whether that SERVER or another user is presently using (i.e., the OWNER of) that PLM.

STEP_INDEX

This attribute is written by the PLM as it sequences through the steps of user supplied state logic modules. The particular codes used to identify each step are a matter of design choice.

PAUSE

This attribute is written by SERVER to instruct the PLM to pause its present processing of a state of a phase.

PAUSED

This attribute is written by PLM to indicate to SERVER that the requested pause has in fact been effectuated. A PAUSE attribute from SERVER may be effectuated at a next opportunity as opposed to immediately effectuated. Logic within PLM determines when it is safe to pause the processing based upon the specific processing being performed.

SINGLE_STEP

This attribute is written by SERVER to instruct PLM to continue processing to a next step. Boundaries between "steps" of processing are determined by PLM based upon specific processing and safety requirements thereof.

TIME

This attribute is a numeric value written by the PLM indicative of the elapsed time since the phase state changed from the idle state. When the PLM transitions to the completed state, the time value stops incrementing (leaving the time consumed by the phase execution). A reset command sets the attribute back to zero.

START_TIME

This attribute is written by the PLM and increments while the PLM is in one articular state thereby indicating the elapsed time in the current state.

BATCH_ID

This attribute is written by the SERVER and supplies an ID value (i.e., character string) for the batch presently in process.

WATCHDOG

The SERVER periodically writes a non-zero value in this attribute and the PLM clears it to zero when it detects a non-zero value. This attribute therefore provides a watchdog feature for the SERVER to detect a failed PLM (and vice versa).

XCOMMAND

In certain circumstances a phase operating under direction of PLM may be controlled by an operator (i.e., manually controlled) rather than by SERVER. To avoid interfering with SERVER's use of BCOMMAND and the sequence number byte thereof, the XCOMMAND attribute is used by an operator to manually control operation of PLM.

Those skilled in the art will recognize many variations and additions to the above described preferred protocol which provide similar functionality for communication between SERVER and PLM. The preferred embodiment described above is considered beneficial primarily in that it resembles the architecture of register model communications already familiar to control engineers. This protocol of the present invention is therefore easier to learn by control engineers familiar with present techniques.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A system for batch control comprising:
   a data processing device;
   a server program operable in said data processing device wherein said server program is operable in accordance with a first state machine for processing of a batch;
   a Phase Logic Module, coupled to said server program and coupled to said data processing device, wherein said Phase Logic Module is operable in accordance with a second state machine substantially identical to said first state machine.

2. The system of claim 1 wherein said Phase Logic Module comprises:
   a soft Phase Logic Module for ancillary control associated with processing of said batch.

3. The system of claim 2 further comprising:
   a second data processing device in which said soft Phase Logic Module is operable; and
   a communication link between said data processing device and said second data processing device which couples said soft Phase Logic Module to said server program.

4. The system of claim 2 wherein said soft Phase Logic Module includes:
   at least one user defined phase state processing element associated with states of said second state machine.

5. The system of claim 4 wherein said user defined state processing elements are defined using standard programming languages.

6. The system of claim 4 wherein said user defined state processing elements are defined using sequential function charts.

7. The system of claim 1 further comprising:
   a programmable controller in which said Phase Logic Module is operable to perform basic control tasks associated with processing of said batch; and
   a communication link between said data processing device and said programmable controller which couples said Phase Logic Module to said server program.

8. The system of claim 7 wherein said Phase Logic Module includes:
   at least one user defined phase state processing element associated with states of said second state machine.

9. The system of claim 8 wherein said user defined state processing elements are defined as sequential function charts.

10. A batch control equipment module comprising:
    a programmable controller adapted to be coupled to a batch server program, wherein the batch server program operable in accordance with a first state machine for processing of a batch; and
    a Phase Logic Module operable in said programmable controller wherein said Phase Logic Module is operable in accordance with a second state machine substantially identical to said first state machine.

11. The batch control equipment module of claim 10 further comprising:
    a communication link coupled to said programmable controller for communication between said Phase Logic Module and an associated batch server program.

12. The batch control equipment module of claim 10 wherein said Phase Logic Module includes:
    at least one user defined phase state processing element associated with states of said second state machine.

13. The batch control equipment module of claim 12 wherein said user defined state processing elements are defined as sequential function charts.

14. An improved system comprising a programmable controller coupled to a batch server, wherein a batch server program is operable in accordance with a first state machine for processing of a batch, and wherein the improvement comprises:
    a Phase Logic Module operable within said programmable controller wherein said Phase Logic Module is operable in accordance with a second state machine substantially identical to said first state machine.

15. The system of claim 14 wherein said Phase Logic Module includes:
    at least one user defined phased state processing element associated with states of said second state machine.

16. The system of claim 15 wherein said user defined state processing elements are defined as sequential function charts.

* * * * *

UNITED STATES PATENT AND TRADEMARK OFFICE
CERTIFICATE OF CORRECTION

| | |
|---|---|
| PATENT NO. | : 6,289,252 B1 |
| DATED | : September 11, 2001 |
| INVENTOR(S) | : Wilson et al. |

It is certified that error appears in the above-identified patent and that said Letters Patent is hereby corrected as shown below:

<u>Drawings,</u>
Sheet 2 of 8, Fig. 2, in the box labeled 208, "RUNNING" should be -- STOPPING --

Signed and Sealed this

Sixteenth Day of April, 2002

Attest:

JAMES E. ROGAN
Attesting Officer    Director of the United States Patent and Trademark Office